United States Patent [19]

Maisotsenko et al.

[11] Patent Number: 4,971,245
[45] Date of Patent: Nov. 20, 1990

[54] HEATER-COOLER OF A VEHICLE CAB

[76] Inventors: Valery S. Maisotsenko, ulitsa Sadovaya, 21, kv.7, Odessa; Alexandr N. Gershuni, ulitsa Ulyanovykh, 33, kv.19, Kiev; Vladilen K. Zaripov, Prospekt Tychiny, 12a, kv. 66, Kiev; Mikhail G. Semena, ulitsa V.Pika, 11, kv.63, Kiev; Alexandr I. Levterov, ulitsa Draizera, 8a, kv.54, Kiev; Mikhail O. Kolosovsky, ulitsa Bastionnaya, I/36, kv.6, Kiev, all of U.S.S.R.

[21] Appl. No.: 368,347
[22] PCT Filed: Dec. 17, 1987
[86] PCT No.: PCT/SU87/00147
 § 371 Date: Jun. 8, 1989
 § 102(e) Date: Jun. 8, 1989
[87] PCT Pub. No.: WO89/03317
 PCT Pub. Date: Apr. 20, 1989

[30] Foreign Application Priority Data

Oct. 9, 1987 [SU] U.S.S.R. ............... 4311230

[51] Int. Cl.⁵ ............... B60H 1/02
[52] U.S. Cl. ............... 237/12.3 A; 237/12.3 R; 126/113
[58] Field of Search ............... 237/12.3 A, 12.3 B, 237/12.3 R, 12.3 C; 126/113; 62/304, 309, 311; 165/60, 61, 59, 42, 43

[56] References Cited

FOREIGN PATENT DOCUMENTS 1057334 11/1983 U.S.S.R. .

Primary Examiner—Henry A. Bennet
Attorney, Agent, or Firm—Lilling and Lilling

[57] ABSTRACT

In a casing of an air heater-cooler there is mounted an additional partition between the wall of the casing and a main partition to form a section for the passage of a heat transfer agent being utilized. Heat transfer elements are provided with finned inserts freely fitted on the surface of the heat transfer elements in the above section and in a section, for the passage of the flow of air being humidified, a capillary porous lining is made at the surface of the inserts.

3 Claims, 2 Drawing Sheets

HEATER-COOLER OF A VEHICLE CAB

BACKGROUND OF THE INVENTION

1. Field of the Invention

This invention relates generally to air conditioning, and more particularly to a heater-cooler of air in cabs and compartments of vehicles.

The invention can also be used for heating and cooling air in production spaces and living rooms.

2. Description of the Related Art

There are known heaters for heating the incoming air and the cab of a vehicle, in which highly efficient heat transfer elements are used. These elements function according to the principle of closed evaporation-condensation cycle. The working liquid is returned from the condensation zone to the evaporation zone along a capillary structure under the action of capillary forces (such heat transfer elements are known as thermal tubes), or only along the shell wall of the element under the action of forces of gravity (two-phase thermal siphons). The heat transfer elements are accommodated in the housing of the heater and extend through a vertical or horizontal partition dividing the housing into sections for the passage of air being heated and a heat transfer agent being utilized (such as exhaust gases, hot liquid, used hot air, etc.).

A major disadvantage of these prior art apparatus resides in that they fail to cool air in the summer time of year, and therefore fail to provide comfort conditions for the driver of the vehicle. In addition, such heaters convey to the cab warm dry air of a humidity insufficient to provide comfort for the driver.

There are also known apparatus for cooling air conveyed to the cab of a vehicle through efficient evaporation of a liquid. Such apparatus include evaporative, indirect evaporative, and regeneration indirect evaporative air cooling systems.

One disadvantage of air coolers of evaporative and indirect evaporative type is the low degree to which the air is cooled. Apparatus of the regeneration indirect evaporative type are free from the above disadvantage, although, as the other aforedescribed coolers, they are not capable of heating air in summer the winter time and therefore fail to ensure comfort conditions in the cab of a vehicle.

There is further known an apparatus for heating and cooling air in the cab of a vehicle, which comprises a housing divided by a horizontal partition into two sections, viz. upper and lower sections, trays for water in the lower section, thermal tubes secured vertically in the partition with an outer surface of the lower ends of these tubes lined with a capillary porous material in contact with water, and a port in the horizontal partition having a controllable gate to communicate the outlet part of the upper section with the inlet of the lower section. This apparatus operates as follows. In summer time the incoming flow of hot air passes through the upper section to be split at the outlet therefrom into two flows. The first flow is directed to the cab, whereas the other flow is conveyed through the port in the partition to the lower section, where it is passed over the moist capillary porous material to cause evaporation of moisture, whereby the lower ends of the thermal tubes are cooled, and the working substance present inside the thermal tubes is condensed. The condensate flows along the capillary structure to the upper ends of the thermal tubes to boil out and thereby withdraw heat from the hot air. The cooled air is conveyed to the cab (first flow) and to the lower section (second flow), whereas vapors of the working substance enter the lower ends of the thermal tubes, where they are condensed, after which the cycle is repeated. In winter time of year the port in the partition is closed by the gate, and no water is present in the tray. Exhaust gases from the engine of the vehicle are conveyed to the lower section to pass over the ends of the thermal tubes and cause boiling of the working substance, which in the form of vapors enter the upper ends of the thermal tubes to be condensed and transfer heat to the flow of cold air passing through the upper section. The flow of atmospheric air is heated and conveyed to the cab.

This invention materializing the principle of regenerative indirect evaporation cooling is free of a number of disadvantages inherent in the previously described apparatus, because a single unit ensures both heating the air (in winter) and cooling (in summer) providing comfort conditions for the driver in any time of year. However, expanding the functional capabilities of this apparatus resulted in a number of disadvantages.

A major disadvantage of this known heater-cooler resides in that the second (humidified) air flow is conveyed in summer through the same section (vz., lower section) as is the flow of exhaust gases in winter. In winter this invariably affects wettability of the capillary porous material, followed by clogging of the pores with combustion products, and eventually in summer to fast corrosion of the capillary porous material and housing of thermal tubes caused by acid solutions produced by water-dissolved oxides of the elements present in the combustion products (in the pores of the material). Clogged pores of the capillary porous material fail to provide sufficient wetting and elevation of water to the height of the lower ends of the thermal tubes. Therefore, this apparatus is not sufficiently reliable in operation, and has a rather short service life.

The above apparatus features low heat and cold generation capacity, that is capacity related to the unit volume of the apparatus, due to low efficiency of the processes of heat and mass transfer in the sections. Such low efficiency is caused by small heat and mass exchange surface, since the thermal tubes have smooth walls, and the porous lining is provided at the outer insufficient surface area of the housing of the thermal tubes.

In the cold time of year heating of air in the known apparatus is accompanied by a sudden drop in the relative humidity of air. For example, heating of air from minus 10° C. (even at a very high relative humidity of 90%) to plus 20° C. is accompanied by a reduction in its relative humidity to 10%, which is substantially below comfort humidity of air which normally must be not less than 50%.

Another disadvantage is the vertical positioning of the thermal tubes in the horizontal partition, since during cooling air in summer the thermal tubes operate in rather unfavorable antigravity conditions (the working liquid moves along the capillaries from the lower ends of the thermal tubes to the upper ends in a direction counter to the gravity forces). This in turn substantially reduces the heat transfer capacity of the thermal tubes, as compared with the horizontal tube arrangement, which affects the efficiency of the apparatus.

Further, this known apparatus is difficult to service and repair because, firstly, it requires frequent and periodic cleaning of the capillary porous material from contaminants including products of combustion, or complete removal of such material followed by the application of new porous material, and secondly, water tends to evaporate from the tray, and the driver is obliged to periodically replenish it.

SUMMARY OF THE INVENTION

The invention aims at providing an air heater-cooler with sections for conveying the flows of heat transfer agents and heat transfer elements constructed so as to increase its efficiency and ensure comfort conditions for the driver in any time of year.

The aims of the invention are attained by a heater-cooler of a vehicle cab comprising a casing divided by a partition into a section for the passage of the flow of air being cooled and a section for the passage of the flow of air being humidified accommodated inside the casing, and heat transfer elements extending through the partition and having in the section for the passage of the flow of air being humidified a capillary porous lining contacting with a liquid medium, holes being provided in the casing intended to admit and discharge the air being cooled and a heat transfer agent being utilized, and a port having a controllable gate communicating the sections therebetween and provided in said partition, according to the invention, it has an additional partition disposed between one walls of the casing and main partition to form a section for the passage of the heat transfer agent being utilized, the heat transfer elements being provided with finned inserts accommodated in the section for the passage of the heat transfer agent being utilized and section for the passage of the flow of air being humidified and fitted freely on the surface of the heat transfer elements, the capillary porous lining being also provided at the surface of the insert.

Preferably, an outlet from the section for the passage of the flow of air being humidified has a gate, and in the area of this outlet there is provided a pipe with a controllable gate, whereas the casing in the area of the hole for discharging the air being cooled has a hole with a gate.

Desirably, the proposed heater-cooler is provided with a vessel containing a liquid with a water level controller in the section for the passage of the flow of air being humidified.

The aforedescribed construction of the heater-cooler according to the invention makes it possible to improve its performance characteristics.

The essence of the invention resides in the following. Separation of the casing of the proposed heater-cooler by a partition into a section for the passage of the flow of air being cooled and a section for the passage of the flow of air being humidified and exhaust gases makes the following to be possible. An additional partition can be mounted inside the casing between the wall of the casing and the main partition to form an additional section, where heat transfer elements have no capillary porous lining, and the entire flow of the heat transfer agent, such as exhaust gas, can be conveyed therethrough. Such an arrangement can prevent clogging of the pores of the capillary porous lining with the products of combustion. The heat transfer elements are desirably provided with finned inserts, which are freely fitted on the surface of the heat transfer elements to be detachable in this latter section and in the section for the passage of the flow of air being humidified. This, primarily, allows to increase severalfold the heat exchange surface area in the sections for the passage of the flow of air being cooled and heat transfer agent being utilized, as well as to increase the surface of heat and mass transfer in the section for the passage of the flow of air being humidified due to the provision of capillary porous lining at the surface of inserts disposed in this section. Secondly, in the case of fouling the surface of the inserts, the latter are easily removed, cleaned and replaced, or changed for new inserts.

The outlet from the section for the passage of the flow of air being humidified is preferably provided with a gate, a pipe with a controllable gate in the area of this outlet being preferably provided, whereas the casing is provided, in the area of the hole for discharging the air being cooled, with a hole with a gate to direct to this section in winter time of year an additional flow of air. Such an arrangement allows, along with warm dry flow of air, conveyance to the cab of moisture by the additional flow of air and thereby attains the desired degree of air humidity in the cab for comfort. The level of air humidity in the cab can be controlled by varying the rate of flow of air by the gate of the pipe.

In order to improve the performance of the proposed heater-cooler, a vessel containing a liquid with a level controller is provided in the section for the passage of the flow of air being humidified. This ensures normal functioning of the apparatus for an extensive period of time without replenishing it with the liquid.

The herein proposed heater-cooler has a number of major advantages over the prior art apparatus. As compared with the widely used types of air conditioners, the proposed apparatus requires 3 to 6 times less power for its operation per unit of cold generated, 1.5 to 7 times higher cold generation per unit volume of the conditioner. The proposed apparatus is 10 to 45% less in weight, simple in construction, and easy in fabrication. The proposed apparatus combines the functions of cooling and heating air in one unit. The proposed apparatus lacks such conventional features as compressors, condensers, heaters, pipes, or hazardous working substances.

BRIEF DESCRIPTION OF THE DRAWINGS

The invention will now be described in greater detail with reference to various specific embodiments thereof taken in conjunction with the accompanying drawings, in which.

DESCRIPTION OF THE PREFERRED EMBODIMENTS

Figure 1:
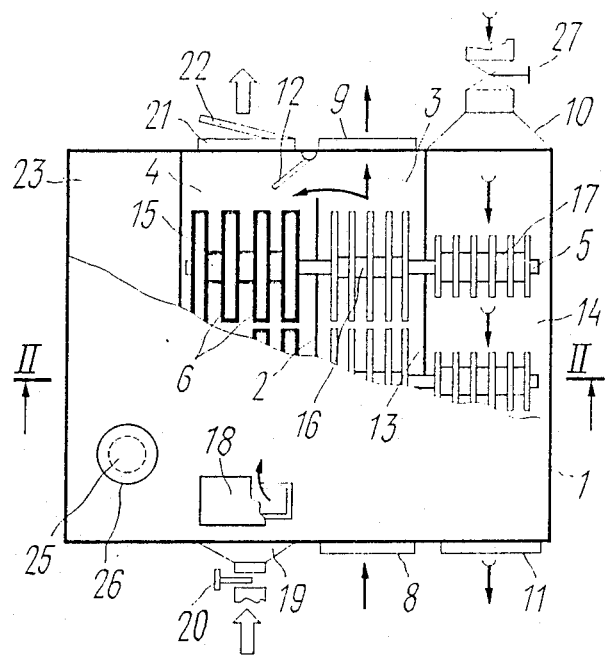
FIG. 1 is a top plan view of a heater-cooler according to the invention.
Figure 2:
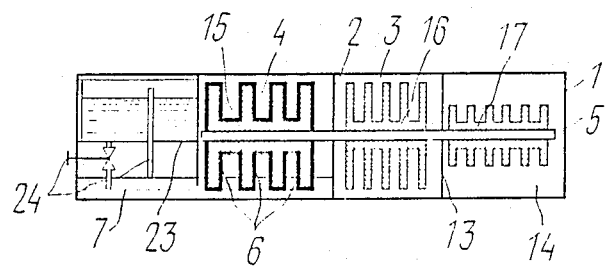
FIG. 2 is a section taken along line II—II in FIG. 1.

A heater-cooler of a vehicle cab with reference to FIGS. 1 and 2 comprises a casing 1, a partition 2 dividing the casing 1 into a section 3 for the passage therethrough of air being cooled, and a section 4 for the passage of air flow being humidified. The housing interior accommodates heat transfer elements 5 extending through the partition 2. Used as the heat transfer elements are, for example, thermal tubes having a capillary interior structure (such as metal felt, mesh, grooves of the like) and a certain quantity of a working liquid, such as water. The heat transfer elements 5 are provided in the section 4 with a capillary porous coating or lining 6 made by any known suitable method immediately on the heat transfer surface, or fabricated from known moisture-permeable capillary porous materials applied thereto and bonded to the heat transfer surface by any known suitable method. The capillary porous lining is adapted to contact by its lower, upper or any other portion with a liquid medium 7, such as water.

Arranged at the casing 1 of the apparatus are holes 8 and 9 to admit and discharge air being cooled, and holes 10 and 11 to admit and discharge a heat transfer agent, such as exhaust gas, hot liquid from the engine cooling system, used hot air, etc.

The partition 2 is provided with a port having a controllable gate 12 to communicate outlet from the section 3 with the section 4. The casing 1 has an additional partition 13 arranged between the wall of the casing 1 and the main partition 2 to form a section 14 wherethrough the heat transfer agent is conveyed. The heat transfer elements 5 have finned inserts 15, 16 and 17, the finned inserts 15, 17 being freely fitted on the surface of the heat transfer elements 5. Such a free fitting in this case means easy detachability, i.e., the lack of rigid non-detachable connection thereof with the surface of the heat transfer elements. Free fitting of the inserts can be materialized, for example, by a sliding fit, or by means of grooves, or by a threaded connection, or in any other suitable manner. The inserts 16 can be secured rigidly non-detachably, or if necessary can also be fitted freely. The surface of the inserts 15 have a capillary porous coating or lining.

Alternatively, the proposed apparatus is arranged so that the outlet of the section 4 for the passage of the air humidified be provided with a gate 18, and that a pipe 19 having a controllable gate 20 be provided in the area of this outlet, whereas the casing 1 in the zone of the hole 9 be provided with a hole 21 having a gate 22.

The apparatus can be provided with a vessel 23 containing a liquid and having a controller 24 of water level in the section 4. Used as a such a controller is any known level controller, for example, a level controller normally used in automobiles and consisting of an air pipe and a liquid pipe with a valve. The vessel 23 has a filler neck 25 and a cap 26. The inlet hole 10 has a pipe with a cock 27. If necessary, the section 4 can be provided with a tray 28 (FIG. 3) for the liquid.

The apparatus according to the invention operates in the following manner. In the summer time the cock 27 is closed, the controllable gate 12 and gate 18 are open, whereas the controllable gate 20 and gate 22 are closed. The vessel 23 is charged with a liquid through the neck 25 and is closed by the cap 26. The valve of the liquid level controller 24 is opened, and water is conveyed to the section 4 or to the tray 28 to occupy this section 4 or the tray 28 to a level preset by the level controller 24. The capillary porous material 6 is impregnated with water to become moist due to the action of capillary forces. A flow of warm atmospheric air is conveyed through the inlet hole 8 to the section 3 to be split at the outlet therefrom into two flows. The first flow is directed through the outlet hole 9 to the cab, whereas the second flow is conveyed through the port with controllable gate 12 to the section 4, where it passes over the moist capillary porous lining 6 on the finned inserts 15 to cause evaporation of water. Evaporation of water from the lining 6 results in a reduction in the temperature of the surface of the finned inserts 15. A temperature gradient between the surface of the inserts 15 and the surface of the finned inserts 16 is developed, whereby the heat transfer elements 5 start to function according to the known closed evaporation-condensation cycle drawing heat off the warm flow of air passing through the section 3. The warm air flow is therefore cooled and, as has been stated previously, is split at the outlet from the section 3 into two flows, one of which is directed to the cab providing comfort conditions for the driver. The second cooled air flow is conveyed through the port having the gate 12 to the section 4, where it again causes vaporization of water from the lining 6 and additional reduction in the temperature of the surface of the inserts 15 to result, accordingly, in an increase in the quantity of heat drawn by the heat transfer elements 6 from the flow of air in the section 3 and reduction in its temperature. The flow of air passing through the section 4 is humidified by water vapours, and is discharged to the atmosphere. As a result of the cyclic character of the aforedescribed continuous process, the air admitted to the cab is cooled to a temperature below the wet bulb point of the atmospheric air. As the liquid vaporizes, its level in the section 4 remains invariable due to the flow of water continuously conveyed from the vessel 23 and level controller 24. In such operating mode the apparatus functions as an air cooler.

In the cold time of year the cock 27 is opened, the controllable gate 12 and gate 18 are closed, whereas the controllable gate 20 and gate 22 are opened. The capillary porous material 6 is saturated with the liquid as a result of procedures described with reference to the description of operation during the summer time of year. The heat transfer agent being utilized is conveyed through the inlet hole 10 to the section 14, and passed over the surface of the finned inserts 17 to heat them. The heat transfer elements 5 act to transfer the heat drawn off the inserts 17 to the inserts 16 and 15. A flow of cold atmospheric air is directed through the inlet hole 8 to the section 3, where it is passed over the surface of the finned inserts 16, heated, and conveyed through the outlet hole 9 to the cab to heat it. At the same time, a quantity of atmospheric air or air drawn from the cab is directed through the pipe 19 and open gate 20 to the section 4, where it is humidified (by virtue of water vaporization from the surface of the lining 6 due to the heat of the finned inserts 15) and conveyed through the outlet hole 21 to the cab. The rate of this flow and, accordingly, the level of humidity in the cab is controlled by the gate 20.

When humidification of air in the cab is not necessary, but more heat must be conveyed to the cab, the valve of the level controller 24 is closed, no water is present in the section 4, and the lining 6 fails to contain moisture. A flow of cold air from the outside is directed to the section 4 to be passed over the surface of the finned inserts 15, heated, and, along with the warm flow of air escaping from the section 3, conveyed to the cab to heat it. In this operating mode the proposed apparatus functions as an air heater.

Figure 3:
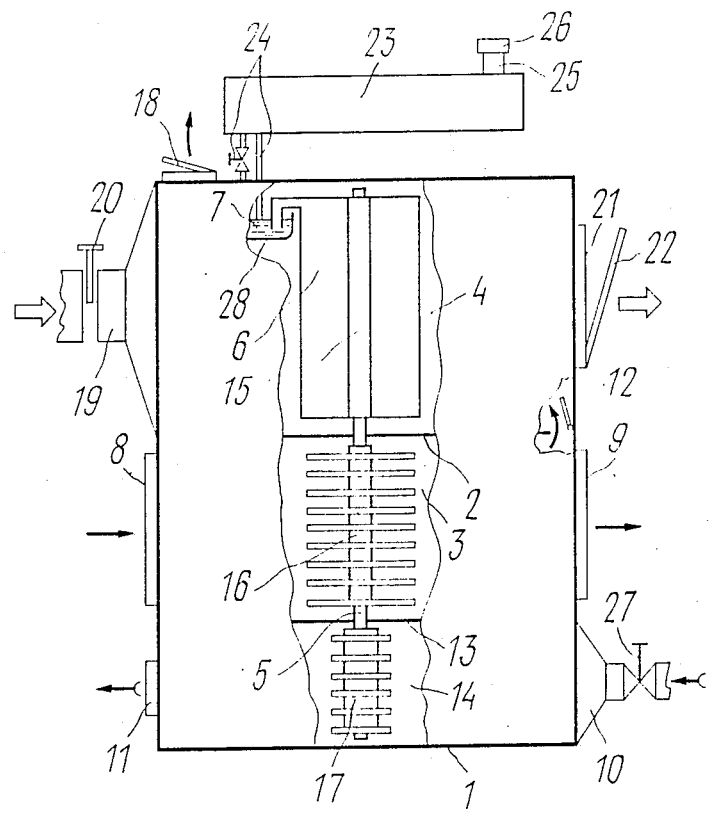
FIG. 3 is a front view of an alternative embodiment of a heater-cooler according to the invention.

FIG. 3 illustrates another alternative embodiment of the heater-cooler according to the invention. In this apparatus, as distinct from the previously described, the partitions 2, 13 are arranged horizontally, whereas the heat transfer elements 5 are disposed vertically. Such an arrangement allows an increase of the efficiency of the heater-cooler due to:

(a) increasing the dimensions of the finned inserts and the contact area of the upper part of the lining with the liquid medium; and (b) ensuring operation of the heat transfer elements in advantageous gravitation conditions (the working liquid inside the elements moves in the direction of the gravitation forces).

Two-phase thermal siphons can be used as the heat transfer elements in this modification of the proposed apparatus. Operation of this modification of the proposed heater-cooler is similar to what has been described heretofore.

It stands to reason that the present invention is not limited by the proposed embodiments, and that other modified forms of the proposed heater-cooler are possible without departing from the spirit and scope of the invention.

INDUSTRIAL APPLICABILITY

The proposed heater-cooler can be used for cooling or heating the air inside cabins and compartments of such vehicles as cars, trucks, buses, tractors, combines, road-making machines, river and sea-going vessels, airplanes, helicopters, etc. When the apparatus operates in the heating mode, it is possible to utilize the heat of exhaust gases, hot liquids from the engine cooling system used hot air, and the like. For such application it is preferable to use the modification shown in FIG. 1. This modified form of the proposed heater-cooler is fashioned as a flat block mountable on a vehicle roof or in the baggage compartment, or alternatively arranged in the cabin or compartment of the vehicle to communicate with the cabin by way of an air conduit.

The proposed heater-cooler can also be used for cooling or heating the air in living rooms or production premises. It is especially advantageous to use the proposed apparatus in:

(a) spaces surrounded by an outside air temperature of not less than 50°-70° C., where vapor compression systems are not sufficiently reliable due to high pressures of the heat transfer agent; and (b) spaces, where there are warm process air in summer, or cold air and exhaust heat carrier in winter; no extra power consumption for the operation of the proposed apparatus is required.

For the aforedescribed applications of the proposed apparatus it is possible to use both modifications shown in FIGS. 1 and 3, which can be mounted on the floor or ceiling, built into a wall under a window, or placed on a table, etc. For larger spaces requiring high rates of air flows (such as production shops, auditoriums, etc.). It is advantageous to use the arrangement of the apparatus shown in FIG. 3, which has the form of a flat vertical block, and can be installed lengthwise of a wall or built into the wall.

We claim:

1. A heater-cooler of a vehicle cab, comprising: a casing divided by a main partition into a section for the passage of the flow of air being cooled and a section for the passage of the flow of air being humidified accommodated inside the casing, and heat transfer elements extending through the partition and having in the section for the passage of the flow of air being humidified a capillary porous lining contacting with a liquid medium, holes provided in the casing and intended to admit and discharge the air being cooled and a heat transfer agent being utilized, and a port having a controllable gate allowing communication between the sections and being provided in the partition characterized in that it has an additional partition disposed between a wall of the casing and the main partition to form a section for the passage of the flow of heat transfer agent being utilized, the heat transfer elements also extending through the additional partition and being provided with finned inserts accommodated in the section for the passage of the flow of heat transfer agent and the section for the passage of the flow of air being humidified, said finned inserts being fitted freely on the surface of the heat transfer elements, the capillary porous lining being also provided at the surface of the inserts.

2. A heater-cooler as claimed in claim 1, characterized in that an outlet from the section for the passage of the flow of air being humidified has a gate, and in the area of this outlet there is provided a pipe with a controllable gate, whereas the casing in the area of the hole for discharging the air being cooled has a hole with a gate.

3. A heater-cooler as claimed in claim 1, characterized in that it is provided with a vessel containing a liquid with a water level controller in the section for the passage of the flow of air being humidified.

* * * * *